US012315320B2

(12) United States Patent
Ryd et al.

(10) Patent No.: US 12,315,320 B2
(45) Date of Patent: May 27, 2025

(54) HANDLING ACCESS RIGHTS FOR ACCESS TO A PHYSICAL SPACE

(71) Applicant: ASSA ABLOY AB, Stockholm (SE)

(72) Inventors: Gustav Ryd, Stockholm (SE); Frans Lundberg, Saltsjöbaden (SE)

(73) Assignee: ASSA ABLOY AB, Stockholm (SE)

( * ) Notice: Subject to any disclaimer, the term of this patent is extended or adjusted under 35 U.S.C. 154(b) by 51 days.

(21) Appl. No.: 18/547,017

(22) PCT Filed: Feb. 17, 2022

(86) PCT No.: PCT/EP2022/053947
§ 371 (c)(1),
(2) Date: Aug. 18, 2023

(87) PCT Pub. No.: WO2022/175389
PCT Pub. Date: Aug. 25, 2022

(65) Prior Publication Data

US 2024/0321029 A1 Sep. 26, 2024

(30) Foreign Application Priority Data

Feb. 19, 2021 (SE) .................................... 2150179-6

(51) Int. Cl.
*G07C 9/27* (2020.01)

(52) U.S. Cl.
CPC ...................................... *G07C 9/27* (2020.01)

(58) Field of Classification Search
CPC .................................... G07C 9/22; G07C 9/27
See application file for complete search history.

(56) References Cited

U.S. PATENT DOCUMENTS 9,531,727 B1 12/2016 Himberger et al.
2014/0266573 A1 9/2014 Sullivan
(Continued)

FOREIGN PATENT DOCUMENTS

CN 109523676 3/2019
JP 2006079598 3/2006
(Continued)

OTHER PUBLICATIONS

"201054PC_220318_PCT-IB-304_Notification re submission of priority document", (Mar. 18, 2022), 1 page.
(Continued)

*Primary Examiner* — Nabil H Syed
(74) *Attorney, Agent, or Firm* — Schwegman Lundberg & Woessner, P.A.

(57) ABSTRACT

It is provided a method for handling access rights for access to a physical space (16*a-g*), comprising: communicating (40) with a credential (2) of a user (5), based on short-range wireless communication; determining (42) that the credential (2) does not currently have access rights to access the physical space (16*a-g*); finding (44) a communication address to a superior (6) to the user (5); generating (46) an increased-access request message, comprising a link that, when activated, adds a first access role to the user (5); sending (48) the increased-access request message to the address of the superior (6); receiving (50) an indication that the superior has activated the link, adding the first access role to the user (5); and granting (52) access for the user (5) to the physical space (16*a-g*).

13 Claims, 2 Drawing Sheets

(56) References Cited

U.S. PATENT DOCUMENTS

| | | | | |
|---|---|---|---|---|
| 2017/0193720 | A1* | 7/2017 | Eyring | G07C 9/38 |
| 2017/0213404 | A1* | 7/2017 | Sivalingam | G06F 16/9535 |
| 2020/0162905 | A1* | 5/2020 | Pernyer | H04W 12/0431 |
| 2021/0272403 | A1* | 9/2021 | Eathakota | G07C 9/28 |

FOREIGN PATENT DOCUMENTS

| | | |
|---|---|---|
| WO | 2018005837 | 1/2018 |
| WO | 2022175389 | 8/2022 |

OTHER PUBLICATIONS

"201054PC_230526_PCT-IPEA-429_Notification re informal communication", (May 26, 2023), 3 pages.
"International Application Serial No. PCT EP2022 053947 ISR and WO mailed Jun. 9, 2022", (Jun. 9, 2022), 17 pages.
"International Application Serial No. PCT EP2022 053947 IPRP mailed Jun. 6, 2023", (Jun. 6, 2023), 14 pages.
"201054SE_221208_2nd Office Action", (Dec. 8, 2022), 6 pages.
"201054PC_230201_2nd Written Opinion", (Feb. 1, 2023), 11 pages.
"201054SE_210930_1st Office Action incl SE search report", (Sep. 30, 2021), 7 pages.

* cited by examiner

HANDLING ACCESS RIGHTS FOR ACCESS TO A PHYSICAL SPACE

CROSS-REFERENCE TO RELATED APPLICATION(S)

This application is a national stage application under 35 U.S.C. § 371 of PCT Appl. No. PCT/EP2022/053947, titled "Handling Access Rights for Access to a Physical Space," filed Feb. 17, 2022, which claims priority to Swedish Patent Appl. No. 2150179-6, filed Feb. 19, 2021, each of which is incorporated herein by reference in its entirety.

TECHNICAL FIELD

The present disclosure relates to the field of handling access rights for gaining access to a physical space secured by an access control device.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using an electronic credential (fob, card, etc.). The credential and electronic lock can e.g. communicate over a wireless interface. Such electronic locks provide a number of benefits, including improved flexibility in management of access rights, audit trails, access management, etc.

However, access rights need to be configured for each credential that is to have access to any restricted physical space. The process of configuring access for users and their credentials is labour intensive. Moreover, in large access control systems, such as for large corporations, there are cumbersome access approval procedures that are needed for central access right administrators to manage the access rights.

SUMMARY

One object is to improve how access rights are managed.

According to a first aspect, it is provided a method for handling access rights for access to a physical space. The method being performed in an access control device. the method comprises the steps of: communicating with a credential of a user, based on short-range wireless communication; determining that the credential does not currently have access rights to access the physical space; finding a communication address to a superior to the user; generating an increased-access request message, comprising a link that, when activated, adds a first access role to the user, the first access role implying that the access control device should grant access for the user to the physical space; sending the increased-access request message to the address of the superior; receiving an indication that the superior has activated the link, adding the first access role to the user; and granting access for the user to the physical space.

The method may further comprise the step of: receiving a user input indicating that the user requests increased access rights.

The short-range wireless communication may comply with RFID, Radio-Frequency Identification, or NFC, Near-Field Communication.

The address may be an e-mail address.

The address may be a phone number.

The method may further comprise the step of: determining that usage of a second access role assigned to the user is less than a threshold; generating a decreased-access request message, the decreased-access request message comprising a link that, when activated, removes the second access role of the user; and sending the decreased-access request message to the address of the superior.

According to a second aspect, it is provided an access control device for handling access rights for access to a physical space. The access control device comprises: a processor; and a memory storing instructions that, when executed by the processor, cause the access control device to: communicate with a credential of a user, based on short-range wireless communication; determine that the credential does not currently have access rights to access the physical space; find a communication address to a superior to the user; generate an increased-access request message, comprising a link that, when activated, adds a first access role to the user, the first access role implying that the access control device should grant access for the user to the physical space; send the increased-access request message to the address of the superior; receive an indication that the superior has activated the link, adding the first access role to the user; and grant access for the user to the physical space.

The access control device may further comprise instructions that, when executed by the processor, cause the access control device to: receive a user input indicating that the user requests increased access rights.

The short-range wireless communication may comply with RFID, radio-frequency identification, or NFC, near-field communication.

The address may be an e-mail address.

The address may be a phone number.

The access control device may further comprise instructions that, when executed by the processor, cause the access control device to: determine that usage of a second access role assigned to the user is less than a threshold; generate a decreased-access request message, the decreased-access request message comprising a link that, when activated, removes the second access role of the user; and send the decreased-access request message to the address of the superior.

According to a third aspect, it is provided a computer program for handling access rights for access to a physical space. The computer program comprises computer program code which, when executed on an access control device causes the access control device to: communicate with a credential of a user, based on short-range wireless communication; determine that the credential does not currently have access rights to access the physical space; find a communication address to a superior to the user; generate an increased-access request message, comprising a link that, when activated, adds a first access role to the user, the first access role implying that the access control device should grant access for the user to the physical space; send the increased-access request message to the address of the superior; receive an indication that the superior has activated the link, adding the first access role to the user; and grant access for the user to the physical space.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

According to embodiments presented herein, a convenient way to handle access rights is provided. When a user is denied access by an access control device, the supervisor of the user can approve access to the user and assign an appropriate access role for the user by simply clicking a link in a message sent to the supervisor. In such a system, the supervisor, who also knows the user, can conveniently and swiftly approve access when appropriate. This solution both reduces waiting time for the user and improves control for the supervisor, and reduces burden and risk of mismanagement of any central access right administration. This is a significant improvement from the prior art, where central administrators manually assign roles to users based on information from others, a process that is error-prone, that leads to substantial administrative work and often leads to granting more access than needed.

Figure 1:
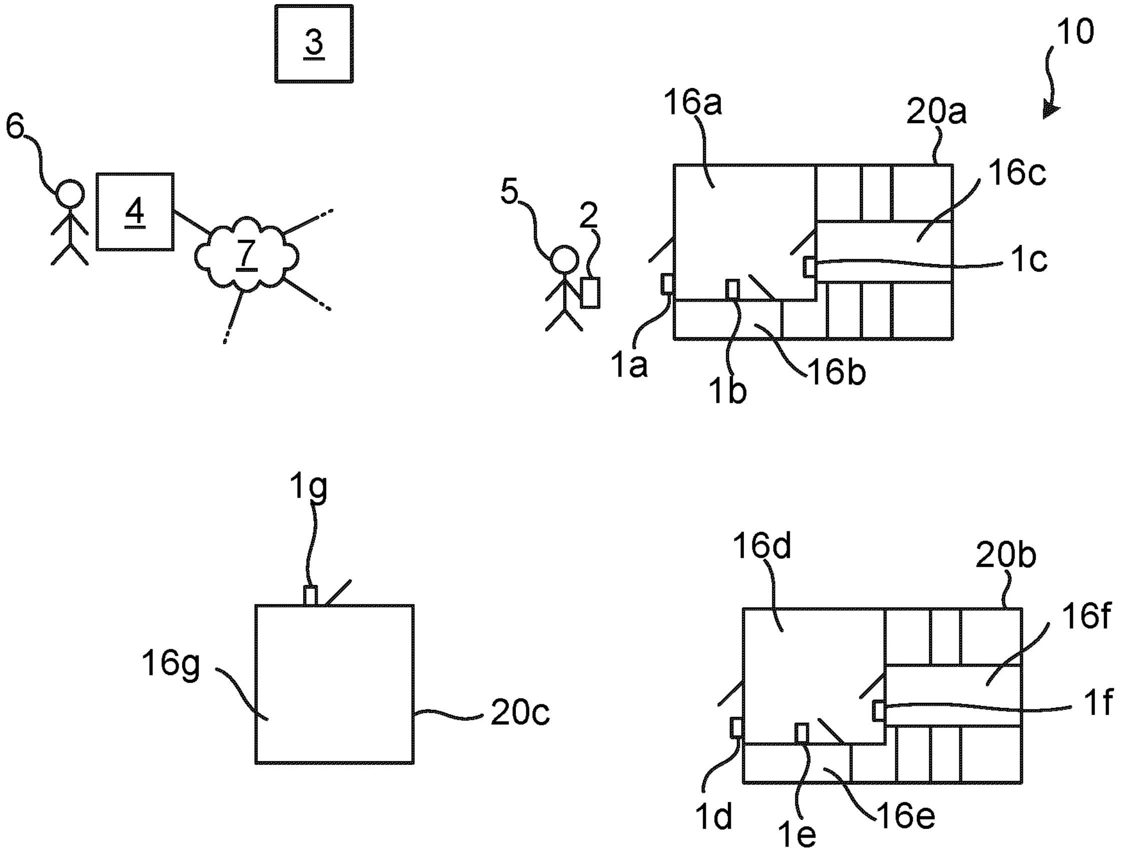
FIG. 1 is a schematic diagram illustrating an environment in which embodiments presented herein can be applied.

FIG. 1 is a schematic diagram illustrating an environment in which embodiments presented herein can be applied. An (electronic) access control system 10 contains a plurality of access control devices 1*a-g* and optionally a server 3. While the method is described with reference to a single access control device, the same method can be performed by any of a plurality of access control devices of the access control system 10.

Each access control device 1*a-g* secures access to a respective physical space 16*a-g* by selectively locking or unlocking an electronic lock, based on communication with a credential 2 of a user 5. The electronic lock can form part of the access control device or can be separate, but paired with, the access control device. The communication between the access control device and the credential 2 can be short-range wireless communication, e.g. based on RFID (Radio Frequency Identification) or NFC (Near-Field Communication). The communication can also be contact based, e.g. based on galvanic smartcard communication or magnetic card reading. The credential 2 does not need to have a user interface and can be implemented as an access card or key fob.

The access control devices 1*a-g* can be grouped based on their physical location. For instance a first set of access control devices 1*a-c* can secure respective physical spaces 16*a-c* of a first building 20*a*, a second set of access control devices 1*d-f* can secure respective physical spaces 16*d-f* of a second building 20*b* and another access control device 1*g* can secure a physical space 16*g* of a third building 20*c*.

A server 3 can be used to keep track of access rights for credentials in the access control system 10. The server 3 can be connected to a communication network 7, which can be an internet protocol (IP) based network. The communication network 7 can e.g. comprise any one or more of a wired local area network, a local wireless network, a cellular network, a wide area network (such as the Internet), etc. The communication network 7 can be used for communication between the server 3 and any online components of the access control system 10, e.g. all or a subset of the access control devices 1*a-g*.

A supervisor 6 is the supervisor, or manager, of the user 5. The supervisor 6 has access to an electronic device 4 that can receive messages via the communication network 7. For instance, the electronic device 4 can be a desktop computer, a laptop computer, a tablet computer, a smartphone, a wearable device, etc.

When the credential 2 is presented to one of the access control devices 1*a-g*, the access control device in question checks the access rights for the credential to determine whether to grant or deny access. As described in more detail below, this is based on access roles. For instance, a first access role can be used to grant access to the first building 20*a*, a second access role can be used to grant access to the second building 20*b* and a third access role can be used to grant access to the third building 20*c*. Each access control device 1*a-g* can determine which access role(s) that are to be granted access. Access roles can be defined in any other way, including overlapping access rights between access roles.

According to embodiments presented herein, when the user 5 is denied access by one of the access control devices 1*a-g*, the access control device can send a message to the supervisor 6 (or more specifically, the electronic device 4 of the supervisor), asking whether the user 5 is to be granted access to the physical space secured by the access control device. Since the supervisor 6 knows the user 5, the supervisor can easily determine whether the user 5 should be allowed the requested access or not. This also reduces or even eliminates the need for any central administration of access rights.

Figure 2:
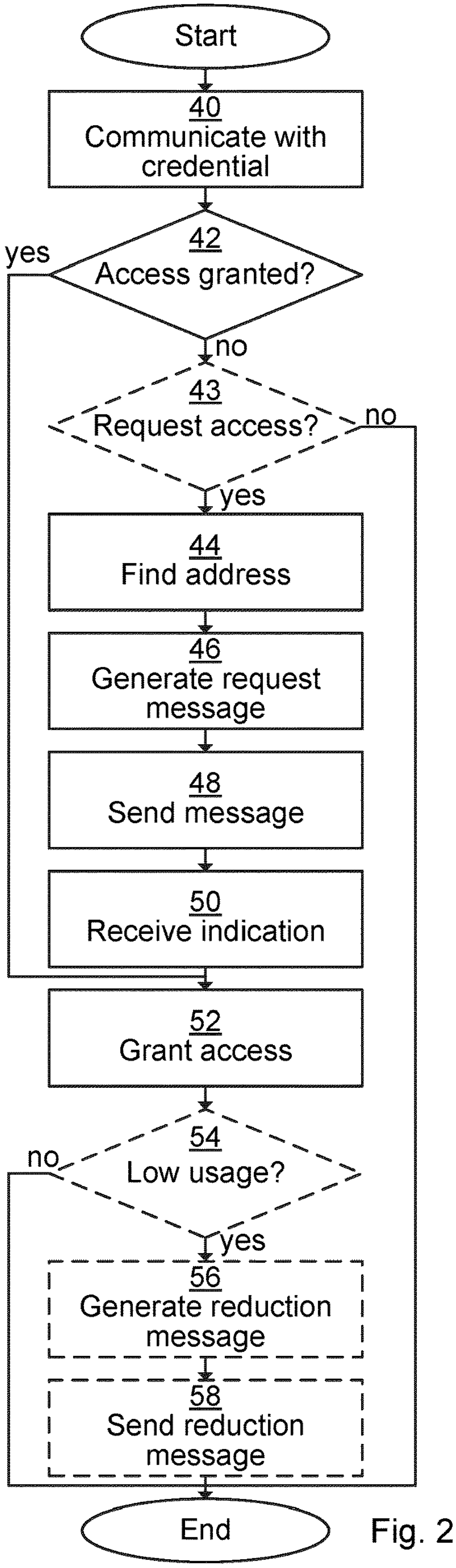
FIG. 2 is a flow chart illustrating embodiments of methods for handling access rights for access to a physical space for the user.

FIG. 2 is a flow chart illustrating embodiments of methods for handling access rights for access to a physical space 16*a-g* for the user 5. The method is performed in an access control device 1, 1*a-g*.

In a communicate with credential step 40, the access control device communicates with a credential 2 of a user 5, based on short-range wireless communication. The short-range wireless communication can e.g. comply with RFID (Radio-Frequency Identification) or NFC (Near-Field Communication). As explained above, the credential 2 can e.g. be in the form of a card or key fob. An identifier of the credential can be obtained in this step. Optionally, one or more access roles of the user (stored on the credential) are also obtained from the credential in this step. The access roles can be cryptographically signed by a trusted party to ensure that they are valid. The credential is thus associated with one or more access role. Based on the access provided by the access role(s), the credential can thus be used to gain access accordingly. Such access is valid until further notice, e.g. until the association between the credential and the access role(s) is removed or the definition of the access role is modified.

In a conditional access granted step 42, the access control device determines whether the credential 2 currently has access rights to access the physical space 16*a*-*g*. This determination is based on access roles. The access roles of the user can e.g. be found by querying a (local or remote) database based on the identifier of the credential. Alternatively, the access roles are retrieved from the credential, as described above, and the cryptographic signature applied to the access roles is verified. The signature can have been applied by a trusted party, e.g. an owner of the access control system 10, for which a public key is stored by the access control device. The access control device then determines whether the access role allows access to the physical space secured by the access control device, e.g. based on access role definition, stored locally or remotely. The access role definition defines what access control devices that are to grant access when a credential with the access role is presented. In other words, each access role is associated with one or more access control devices.

If the credential 2 currently has access rights to access the physical space 16*a*-*g*, the method proceeds to a grant access step. Otherwise, the method proceeds to an optional conditional request access step 43, or a find address step if step 43 is not performed.

In the optional conditional request access step 43, the access control device determines whether it receives a user input indicating that the user requests increased access rights or not. For instance, after determining that access is not granted in step 42, this information is presented to the user locally (i.e. in the immediate vicinity of the access control device), e.g. using a display, sounds and/or LED (light emitting diodes), prompting the user whether to query the superior of the user to obtain access. If the user would like the access control device to request the supervisor for access, the user indicates this by manipulating an appropriate user interface element, e.g. by touching an indicated area of a touch screen of the access control device, by pressing an appropriate key of a keypad of the access control device, by voicing a command that is captured by a microphone of the access control device, etc. In any case, if this step is performed and the user would like the access control device to request access, this is indicated in user input of a user interface provided by the access control device.

If this user input is received, the method proceeds to the find address step. Otherwise, the method ends.

In the find address step 44, the access control device finds a communication address to the superior 6 to the user 5. The address is of a form that allows communication that the user requests access and that allows the supervisor to selectively approve the request. For instance, the address can be of a form that enables text-based communication. In one embodiment, the address is in the form of an e-mail address for sending an e-mail. Alternatively or additionally, the address is in the form of a phone number for sending a text message to the superior 6. Alternatively or additionally, the address is in the form of an identifier of the supervisor 6 within the access control system, allowing communication to occur to client software executing in the device of the superior, e.g. in an application also known as an app.

In a generate request message step 46, the access control device generates an increased-access request message. This message comprises a link that, when activated, adds a first access role to the user 5. The link can e.g. be in the form of a URI (Uniform Resource Indicator). The first access role implies that (i.e. is defines that) the access control device 1, 1*a*-*g* should grant access for the user 5 to the physical space 16*a*-*g* that is secured by the access control device performing the method. The link can be addressed to a server 3 of the access control system or to the access control device itself. The request message can also comprise an indication of the user, e.g. a name of the user that has been looked up based on the identifier of the credential, and a descriptor of the access control device and/or physical space secured by the access control device.

As an illustratory example, the text of the request message can be "John Doe requests access to the office of Big Corp at third floor of the building at 10 High St. If you approve access, please click the following link: https://foo.bar.com/12345678". Optionally, the request message also comprises a link to indicate that access is denied. In an illustratory example, the request message than also comprises the text "If you deny access, please click the following link: https://foo.bar.com/87654321". The text and link structure can vary depending on the circumstances.

In a send message step 48, the access control device sends the increased-access request message to the address of the superior 6, or more precisely to the address of a device of the superior. The superior can then decide whether to grant the requested access or not based on the message. The message can be sent directly from the access control device or via the server 3.

In a receive indication step 50, the access control device receives an indication that the superior has activated (e.g. clicked on) the link, adding the first access role to the user 5. The indication is based on the superior approving access by clicking the link in the message. The indication can be received via the server 3 or in a direct HTTP (Hypertext Transfer Protocol) request from the device of the supervisor.

In a grant access step 52, the access control device grants access for the user 5 to the physical space 16*a*-*g* that is secured by the access control device that performs the method. This results in an electronic lock being unlocked, allowing the user to enter the physical space secured by the access control device.

It can thus be seen how embodiments presented herein provide a convenient way to adapt access rights of users of the access control system. No central access right administration needs to be involved and instead the supervisor of each user can manage the access rights of her/his subordinates. Using the link in the increased-access request message, it is very easy for the supervisor to approve the access by simply clicking the link. Also, it is very easy and convenient for the user requesting access to interact with the access control device to request access when needed. The credential does not need a user interface and can e.g. be implemented as an access card or key fob.

The superior approval conveniently occurs using a link in the message to the superior. The link refers to a server that records the action of the superior. Hence, embodiments presented herein are based on separate entities for informing the superior of approval (the user device of the superior) and receiving indication of link activation (from the server in the link). This allows direct communication with the superior, while enabling a secure central repository of access control in the server.

In an optional conditional low usage step 54, the access control device determines whether usage of a second access role assigned to the user is less than a threshold. For instance, the threshold can be expressed as a number of occurrences of access-role usage (to gain access to a physical space) during a specific time period (e.g. last month, last x days, etc.). When usage of the second access role that is assigned to the user is less than the threshold, the method proceeds to an optional generate reduction message step 56. Otherwise, the method ends.

In an optional generate reduction message step 56, the access control device generates a decreased-access request message. The decreased-access request message comprises a link that, when activated, removes the second access role of the user 5. The format of the decreased-access request message can be the same as for the increased-access request message.

In an optional send reduction message step 58, the access control device sends the decreased-access request message to the address of the superior 6. The supervisor can then decide whether to reduce access, by removing the second access role of the user 5 as suggested in the decreased-access request message, in which case, the supervisor clicks the link in the decreased-access request message.

Using the optional steps 54, 56, 58, the system can thus also adapt access rights to allow the supervisor to conveniently remove access rights that are not used. This prevents the user from keeping access rights that are not necessary.

Figure 3:
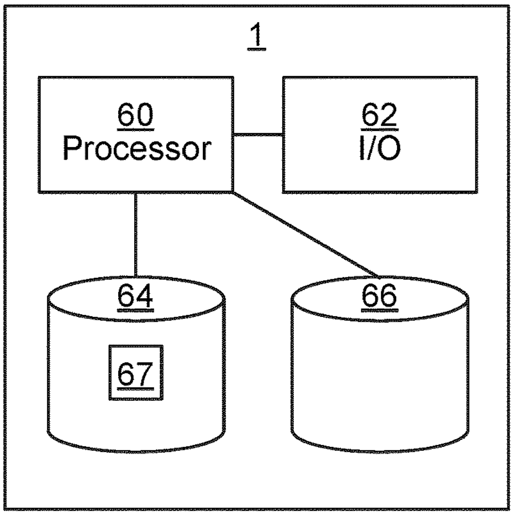
FIG. 3 is a schematic diagram illustrating components of the access control device, which can e.g. be any of the access control devices of FIG. 1.

FIG. 3 is a schematic diagram illustrating components of the access control device 1, which can e.g. be any of the access control devices 1*a*-*g* of FIG. 1. It is to be noted that, when the access control device 1 is implemented in a host device, one or more of the mentioned components can be shared with the host device. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 2 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The access control device 1 further comprises an I/O interface 62 for communicating with external and/or internal entities. The I/O interface 62 also includes a user interface, such as any one or more of a display with or without touch-screen ability, a keypad, etc.

Other components of the access control device 1 are omitted in order not to obscure the concepts presented herein.

Figure 4:
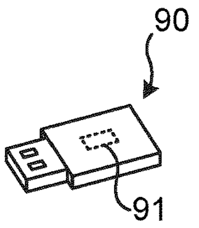
FIG. 4 shows one example of a computer program product comprising computer readable means.

FIG. 4 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 3. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for handling access rights for access to a physical space, the method being performed in an access control device, the method comprising the steps of:

communicating with a credential of a user, based on short-range wireless communication;

determining that the credential does not currently have access rights to access the physical space by determining that there is no access role, associated with the credential, that is associated with the access control device, wherein access roles of the user are found by querying a local or remote database based on an identifier of the credential;

finding a communication address to a superior to the user;

generating an increased-access request message, comprising a link that, when activated, adds a first access role to the user, the first access role implying that the access control device should grant access for the user to the physical space, wherein the link is in the form of a URI, Uniform Resource Indicator, wherein access, provided by the first access role, is valid until an association between the credential and the first access role is removed or a definition of the first access role is modified;

sending the increased-access request message to the address of the superior;

receiving an indication that the superior has activated the link, thereby adding the first access role to the user; and granting access for the user to the physical space.

2. The method according to claim 1, further comprising the step of:

receiving a user input indicating that the user requests increased access rights.

3. The method according to claim 1, wherein the short-range wireless communication complies with RFID, Radio-Frequency Identification, or NFC, Near-Field Communication.

4. The method according to claim 1 wherein the address is an e-mail address.

5. The method according to claim 1, wherein the address is a phone number.

6. The method according to claim 1 further comprising the step of:

determining that usage of a second access role assigned to the user is less than a threshold, wherein the second access role is usable to gain access to a physical space;

generating a decreased-access request message, the decreased-access request message comprising a link that, when activated, removes the second access role of the user; and sending the decreased-access request message to the address of the superior.

7. An access control device for handling access rights for access to a physical space, the access control device comprising:

a processor; and a memory storing instructions that, when executed by the processor, cause the access control device to:

communicate with a credential of a user, based on short-range wireless communication;

determine that the credential does not currently have access rights to access the physical space by determining that there is no access role, associated with the credential, that is associated with the access control device, wherein access roles of the user are found by querying a local or remote database based on an identifier of the credential;

find a communication address to a superior to the user;

generate an increased-access request message, comprising a link that, when activated, adds a first access role to the user, the first access role implying that the access control device should grant access for the user to the physical space, wherein the link is in the form of a URI, Uniform Resource Indicator, wherein access, provided by the first access role, is valid until an association between the credential and the first access role is removed or a definition of the first access role is modified;

send the increased-access request message to the address of the superior;

receive an indication that the superior has activated the link, thereby adding the first access role to the user; and grant access for the user to the physical space.

8. The access control device according to claim 7, further comprising instructions that, when executed by the processor, cause the access control device to:

receive a user input indicating that the user requests increased access rights.

9. The access control device according to claim 7, wherein the short-range wireless communication complies with RFID, radio-frequency identification, or NFC, near-field communication.

10. The access control device according to claim 7, wherein the address is an e-mail address.

11. The access control device according to claim 7, wherein the address is a phone number.

12. The access control device according to claim 7, further comprising instructions that, when executed by the processor, cause the access control device to:

determine that usage of a second access role assigned to the user is less than a threshold, wherein the second access role is usable to gain access to a physical space;

generate a decreased-access request message, the decreased-access request message comprising a link that, when activated, removes the second access role of the user; and send the decreased-access request message to the address of the superior.

13. A non-transitory computer readable medium storing a computer program for handling access rights for access to a physical space, the computer program comprising computer program code which, when executed on an access control device causes the access control device to:

communicate with a credential of a user, based on short-range wireless communication;

determine that the credential does not currently have access rights to access the physical space by determining that there is no access role, associated with the credential, that is associated with the access control device, wherein access roles of the user are found by querying a local or remote database based on an identifier of the credential;

find a communication address to a superior to the user;

generate an increased-access request message, comprising a link that, when activated, adds a first access role to the user, the first access role implying that the access control device should grant access for the user to the physical space, wherein the link is in the form of a URI, Uniform Resource Indicator, wherein access, provided by the first access role, is valid until an association between the credential and the first access role is removed or a definition of the first access role is modified;

send the increased-access request message to the address of the superior;

receive an indication that the superior has activated the link, adding the first access role to the user; and grant access for the user to the physical space.

* * * * *